United States Patent
Kolivas

[11] 3,756,140
[45] Sept. 4, 1973

[54] BARBECUE PIT
[76] Inventor: John G. Kolivas, 1618 National St., Memphis, Tenn.
[22] Filed: June 12, 1972
[21] Appl. No.: 262,021

Related U.S. Application Data
[63] Continuation-in-part of Ser. No. 870,675, Jan. 15, 1971, abandoned.

[52] U.S. Cl. .................. 99/339, 99/443 R, 99/446, 126/8
[51] Int. Cl. ........................................... A47j 37/07
[58] Field of Search .................. 99/339, 340, 421 P, 99/421 V, 443 R, 444, 446, 450; 126/8, 25

[56] References Cited
UNITED STATES PATENTS

| | | | |
|---|---|---|---|
| 1,595,846 | 8/1926 | Wood | 99/446 |
| 2,558,569 | 6/1951 | Koch | 99/443 R |
| 2,751,899 | 6/1956 | Hamilton | 99/443 R UX |
| 3,033,190 | 5/1962 | Atkinson | 99/43 R X |
| 3,098,428 | 7/1963 | Maxwell | 99/446 |
| 3,204,549 | 9/1965 | Palowsky | 99/391 |
| 3,498,211 | 3/1970 | Atkins | 99/443 R |
| 3,344,737 | 10/1967 | Sanders | 99/446 |

*Primary Examiner*—Harvey C. Hornsby
*Assistant Examiner*—Arthur O Henderson
*Attorney*—John R. Walker, III

[57] ABSTRACT

A brick and mortar structure enclosing a pit for rendering and cooking meat. A rotatable circular grill is included which may support the meat above a bed of hot charcoal. A temperature control heater element is positioned above the grill and may be used independently of the charcoal particularly for rendering fat on certain meat prior to cooking it over the charcoal. A plurality of pans are included for receiving the meat during the rendering process so that the hot grease does not drip down into the pit. The pans collectively have an area substantially equal to the area of the grill and are restingly supported thereon. A built in flame extinguisher is provided for extinguishing flames which may flare up as the result of hot great falling onto the burning charcoal.

10 Claims, 15 Drawing Figures

BARBECUE PIT

CROSS REFERENCE TO RELATED APPLICATION

This applicant is a continuation-in-part of my application Ser. No. 870,675, filed Jan. 15, 1971 now abandoned.

BACKGROUND OF THE INVENTION

1. Field of the Invention

This invention pertains to the field of barbecue pits.

2. Description of the Prior Art

The applicant has knowledge of the following U. S. Pat. Nos. 2,138,813; 2,199,584; 2,331,266; 2,591,072; 3,033,189; 3,217,634; 3,220,400; 3,327,616; 3,330,266; 3,344,737; 3,354,848; and 3,498,211. None of the above patents show or suggest applicant's barbecue pit.

SUMMARY OF THE INVENTION

The present invention is directed toward providing a barbecue pit for rendering and cooking meat in a smoke and flame controlled environment. The barbecue pit of the present invention includes a brick and mortar enclosure having a circular inner wall defining a pit which extends upwardly to a dome-like ceiling and terminates downwardly thereof which circular flat floor for receiving a first or primary bed of charcoal fuel. A chimney is provided which communicates with the pit at a predetermined distance below the ceiling so as to capture a pocket of smoke in the upper dome-like portion of the pit. A damper is included which is positioned within the pit adjacent the opening leading into the chimney. Also included is a draft door positioned adjacent the floor for coacting with the damper to selectively allow various amounts of air to pass over the charcoal to support combustion and/or capture various amounts of smoke to impart hickory smoked flavor or the like to the meat being cooked.

A plurality of pans are included for receiving certain meat during the rendering process, as for example, spareribs or the like. Spareribs usually have considerable fat which heretofore melts and drops onto the coals causing flames to flare up which usually chars the meat and adversely affects the flavor thereof. In the present invention, the pans support the meat above the charcoal, thus preventing the grease from falling thereon. Subsequent to the fat being rendered from the meat, the pans are removed and the meat is placed on a rotatable circular grill during the cooking process thereof. A heater element may optionally be incorporated with the barbecue pit of the present invention for the purpose of rendering the fat from the meat prior to cooking. In this instance the heater would preferably be positioned above the grill and includes structure for maintaining various constant temperatures.

The grill is free to rotate about a vertical axis and the outer perimeter thereof defines a cog wheel. A pinion gear, being fixedly attached to a crank, meshingly engages the cog wheel whereby turning the crank is effective to cause rotation of the grill about the vertical axis. Preferably included is a spout which is attached to the pan for conveying the hot grease therefrom to a grease receptacle which is positioned adjacent the exterior of the barbecue pit. In other words, during the rendering process, the pans are not rotated but remain stationary. Therefore, the hot grease can run out the spout and be collected in the external receptacle.

The barbecue pit of the present invention preferably includes a built-in flame extinguisher system for extinguishing flames which flare up as a result of hot grease dripping upon the hot coals and the like. A transparent window or the like is conveniently fitted to the structure for viewing the meat during the cooking process. Additionally, an operable luminaire preferably is positioned in the pit for illuminating the interior thereof and whereby the meat may better be viewed through the transparent window during the cooking process.

An elevated brick structure preferably is included and is positioning within the pit and occupies a pie-shaped portion of the floor area. The area of the grill exceeds the area of the elevated structure and rotating the grill causes the entire area thereof to pass over the elevated structure once with every revolution. Accordingly, a second bed of charcoal may be placed on the elevated structure, and with the first bed of charcoal covering the remaining floor area not being ignited, steaks or the like may be seared by the second bed of charcoal, with the rotation of the grill being effective to intermittently carry the steaks away from the second bed of charcoal particularly in the event flames flare up from the dripping grease.

Power actuated drive means may optionally be included with the barbecue pit of the present invention. The power actuated drive means may include a prime mover for rotating a second pinion gear which meshingly engages the cog wheel defining the outer perimeter of the grill whereby operating the prime mover is effective to rotatably drive the grill about the vertical axis in the same manner as optionally accomplished by the crank.

DESCRIPTION OF THE PREFERRED EMBODIMENT

The barbecue pit 11 of the present invention is intended for both rendering and cooking meat. The barbecue pit 11 may optionally be constructed on a suitable building site wherein the pit 11 is exposed to the elements, thus requiring a roof 13 as depicted in FIG. 2 of the drawings. On the other hand, the barbecue pit may be constructed within a larger structure, for example, a restaurant, thus the roof 13 may be omitted as shown in FIG. 1 of the drawings.

Figure 2:
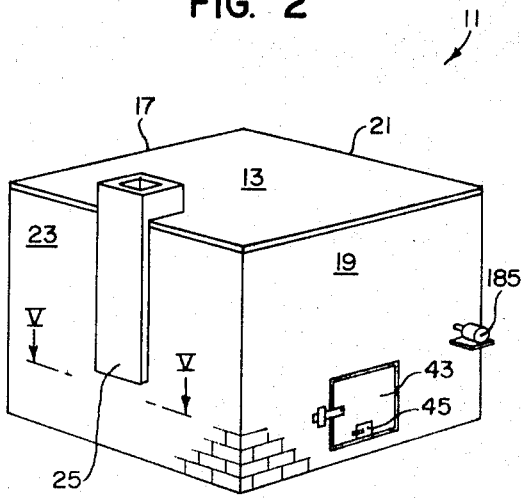
FIG. 2 is a rear perspective view of the barbecue pit of the present invention showing the preferred roof structure when the pit is intended to be exposed to the elements.
Figure 3:
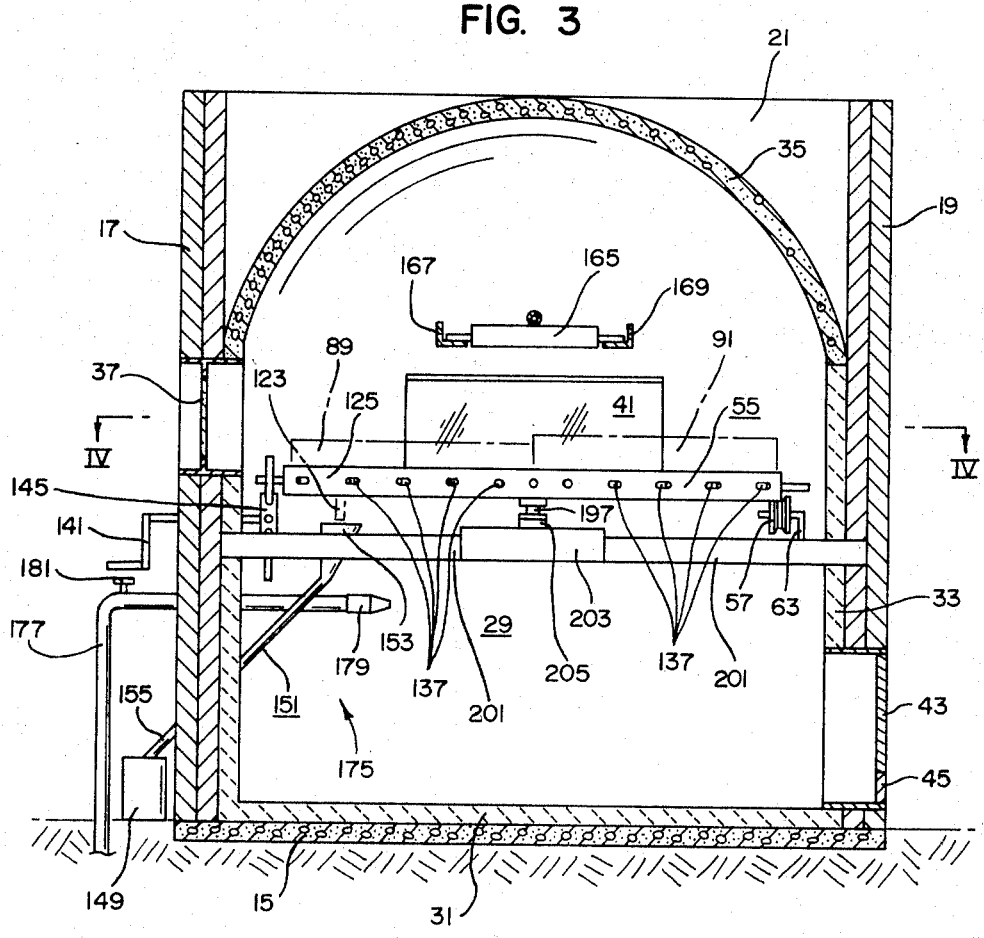
FIG. 3 is a sectional view taken as on the line III—III of FIG. 1.

From FIG. 3 of the drawings, it may be seen that the barbecue pit 11 preferably is provided with a concrete foundation 15 of well known construction. The barbecue pit 11 includes a front wall 17, a rear wall 19, a left side wall 21 and a right side wall 23, as clearly shown in FIGS. 1 – 4 of the drawings. The walls 17, 19, 21, 23 preferably are formed from a double row of brick and mortar of well known construction. A chimney 25 preferably is constructed of well known construction simultaneously with the wall 23.

Figure 4:
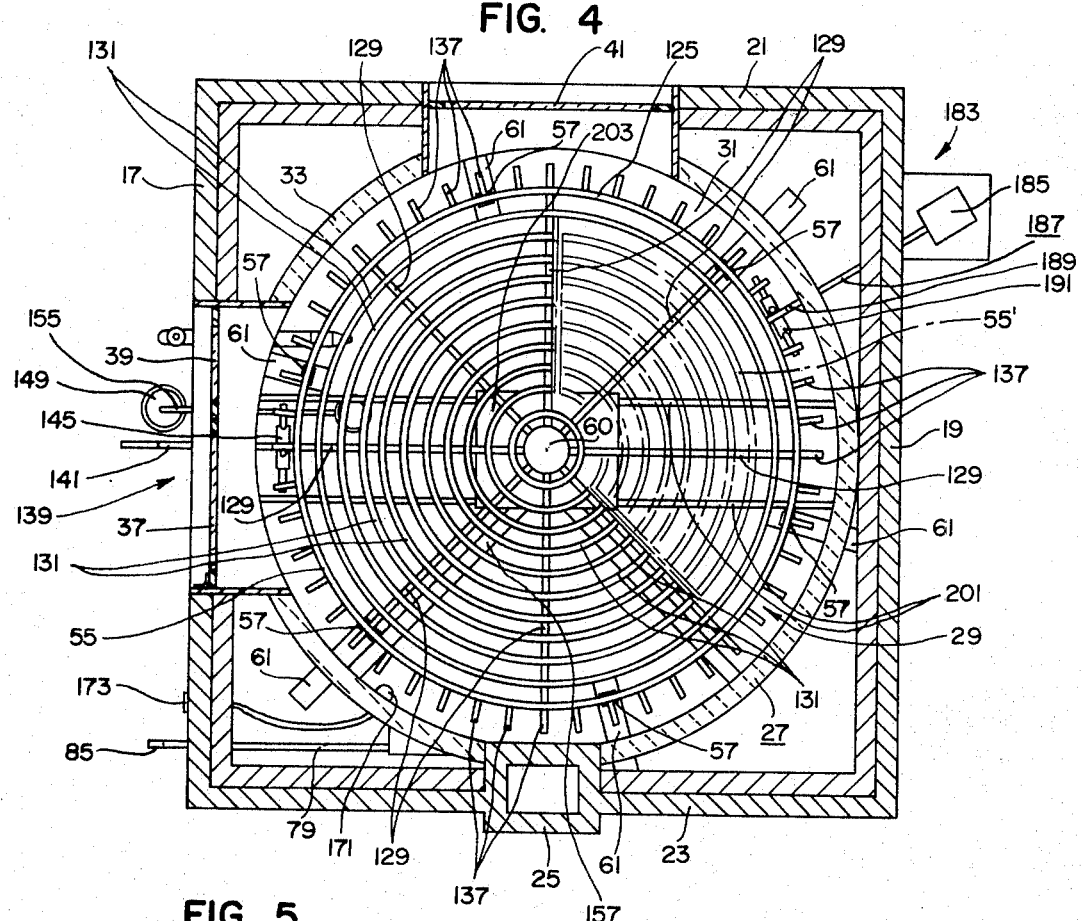
FIG. 4 is a sectional view taken as on the line IV—IV of FIG. 3.

From FIGS. 3 and 4 of the drawings, it may be seen that within the enclosure defined by the walls 17, 19, 21, 23 is a circular inner construction 27 defining a pit 29. The structure 27 preferably includes a circular flat floor 31 formed from firebrick, a circular continuous wall 33 also formed from firebrick, and a dome-like ceiling 35 preferably formed from concrete or other well known construction.

Figure 1:
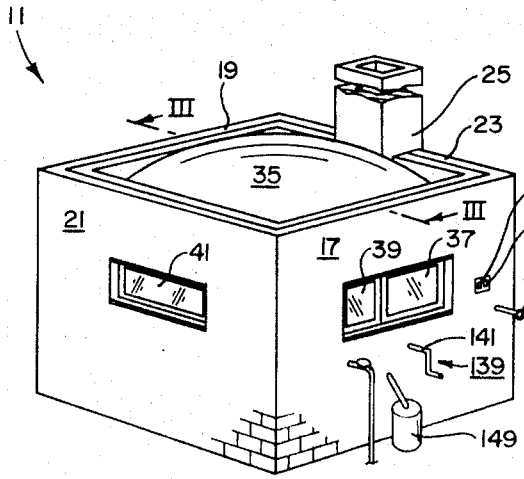
FIG. 1 is a front perspective view of the barbecue pit of the present invention showing the preferred roof structure when the pit is constructed within a larger structure.

From FIGS. 1 and 3 of the drawings, it may be seen that the front walls 17 are provided with access doors 37, 39 which open into the pit 29 for passing the meat therethrough. The access doors 37, 39 preferably include transparent glass panes for viewing the meat during the rendering and/or cooking process. Additionally, the side wall 21 preferably is provided with an elongated window 41 which opens into the pit 29 for the purpose of allowing spectators to view the meat while it is being cooked. The wall 19 is provided with a steel clean-out door 43 positioned adjacent the floor 31. A draft door 45 is provided adjacent the floor 31 which preferably is positioned on the clean-out door 43 as shown in FIG. 2.

Figure 5:
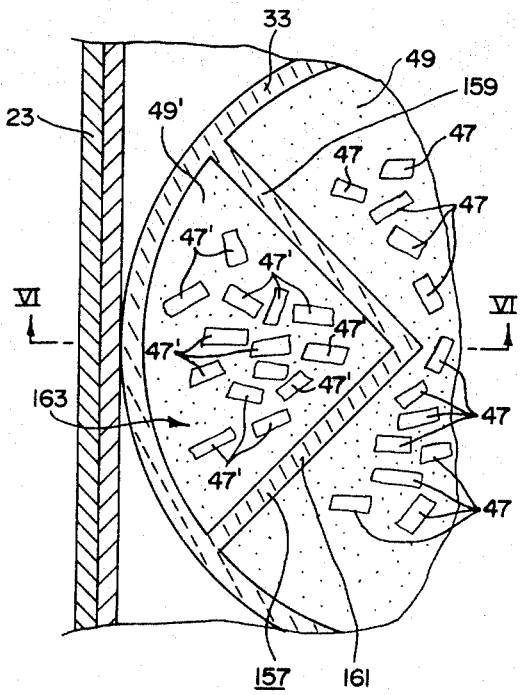
FIG. 5 is a sectional view taken as on the line V—V of FIG. 2.
Figure 6:
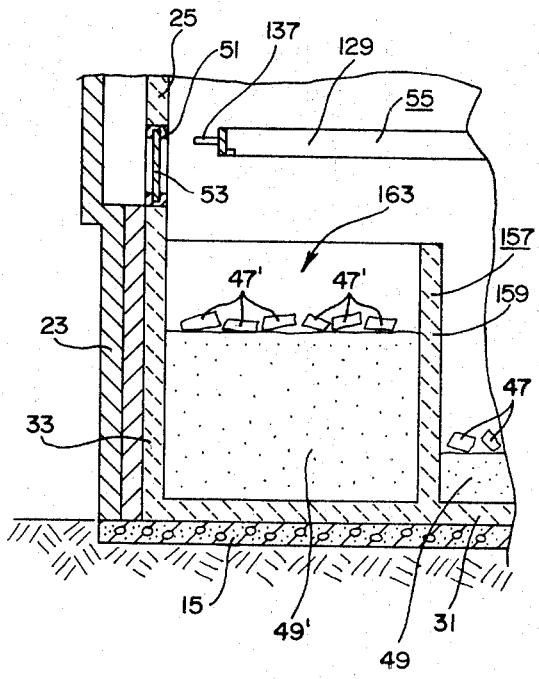
FIG. 6 is a sectional view taken as on the line VI—VI of FIG. 5.
Figure 9:
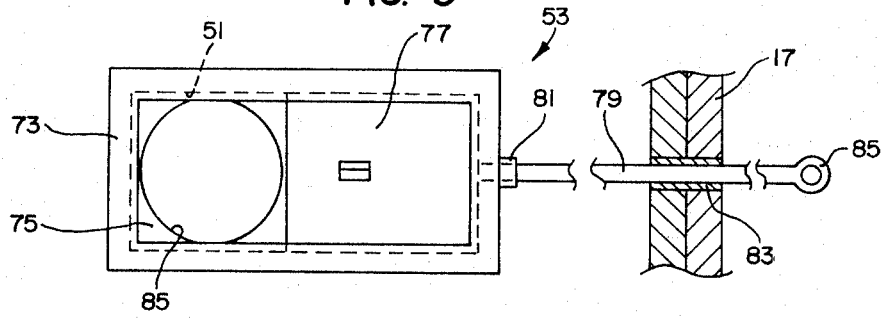
FIG. 9 is an enlarged view of the damper and operating structure thereof.

From FIGS. 5 and 6 of the drawings, it may be seen that the circular floor supports or receives a first bed of charcoal fuel 47, with a layer of sand 49 preferably being interposed between the floor 31 and the charcoal 47. Further, the chimney 25 is provided with a lower opening 51 extending into the pit 29 a predetermined distance below the ceiling 35 substantially as shown in FIG. 6 of the drawings. A damper 53 (FIG. 9) is provided and is positioned adjacent the opening 51. The damper 53 is operable between open and closed positions for selectively opening and closing the opening 51 in a manner yet to be described. In other words, the draft door 45, operable between open and closed positions, coacts in a well known manner with the damper 53 to selectively allow various amounts of air to pass over the charcoal 47 to support combustion thereof.

A circular grill 55 is included for alternately restingly supporting meat and other structure yet to be disclosed.

The barbecue pit 11 also includes a plurality of pulley-like wheels 57 respectively having angular grooves 59 and being rotatably mounted on the enclosure, or more specifically the structure 27, for rotation about horizonal axes intersecting at a common point as at 60.

Figure 8:
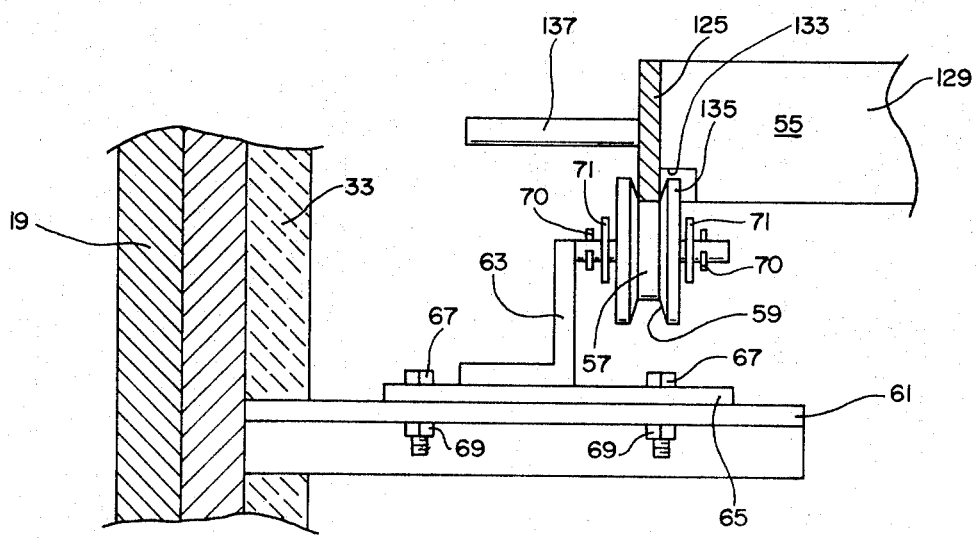
FIG. 8 is a mirror image of an enlarged view of a portion of FIG. 3 showing roller structure supporting the grill.

Support structure for supporting each of the wheels 57 in the above manner is clearly shown in FIG. 8 of the drawings. More specifically, the support structure includes an angleiron support member 61 having one end thereof suitably imbedded in the continuous wall 33 with the other end protruding a predetermined distance into pit 29. Offset members 63 are included and have the upper ends thereof rounded so as to constitute axles for the wheels 57. The lower ends of the offset members 63 respectively are attached to elongated platelike members 65 as by welding or the like. The support members 61 and the platelike members 65 are provided with suitably aligned apertures for receiving attachment bolts 67 which are properly secured by nuts 69. The respective wheels 57 preferably are secured to the offset members 63 by a pair of cotter keys 70, that is, the cotter keys 70 are received in suitable transverse apertures and spacer washers 71 preferably are positioned between the cotter keys 70 and wheels 57.

The damper 53 preferably is positioned subjacent the grill 55 (FIG. 6) so that a pocket of smoke is captured and the grill 55 is constantly exposed to the smoke environment for purposes of enhancing the flavor of the meat in a well known manner. The damper 53 includes a frame portion 73 which is closely fitted to the opening 51, that is, the opening 51 being provided with a typical flue thimble 75. The damper 53 also includes a damper lifter 77 actuated to open and closed position by an actuating rod 79, that is, the damper lifter 77 being provided with a threaded sleeve portion 81 for receiving the threaded rod 79. The rod 79 extends through a bushing 83 suitably fitted in the wall 17. The outer end of the rod 79 preferably includes a ringlike actuating handle 85. More specifically, the flue thimble 75 encloses the opening 51 establishing a circular opening 85 which may be closed by moving the damper lifter 77 to the left as viewed in FIG. 9. Accordingly, moving the rod 79 inwardly is effective to move the damper lifter 77 across the opening 85, thus the opening 85 may be fully closed, fully open or partially open, depending upon the position of the handle 85.

Figure 11:
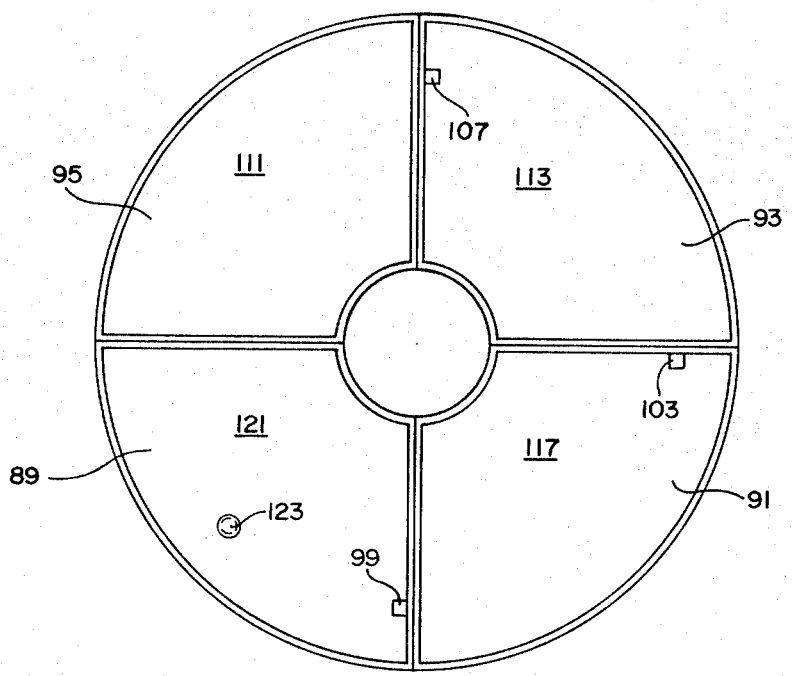
FIG. 11 is a plan view of a plurality of interconnected pans which may optionally be placed on the grill to support meat.
Figure 12:
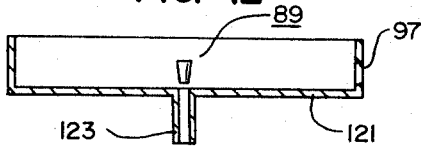
FIG. 12 is a cross sectional view of the first or lowest pan as depicted in FIG. 11.
Figure 13:
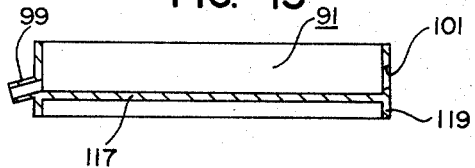
FIG. 13 is a cross sectional view of the second or next to lowest pan as depicted in FIG. 11.
Figure 14:
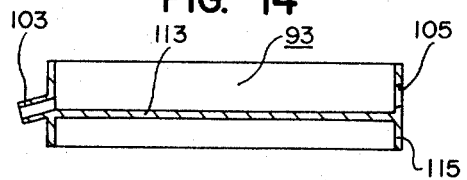
FIG. 14 is a cross sectional view of the third or next to highest elevated pan of FIG. 11.

The barbecue pit 11 preferably includes a plurality of pans 89, 91, 93, 95 for receiving the meat during the rendering process in a manner yet to be disclosed. The pans collectively are shown in phantom in FIG. 3 of the drawings and clearly illustrated in FIGS. 11 – 15 of the drawings. The pans 89, 91, 93, 95 are at different elevations and are communicated one with the other whereby hot grease which accumulates during the rendering process may gravitate from the uppermost pan to the lowermost pan. More specifically, the pans 89, 91, 93, 95 preferably are pie-shaped as depicted in FIG. 11 and may optionally be placed on the grill 55 so that total area thereof substantially covers the area of the grill 55. Additionally, the pan 89 is provided with an opening 97 for receiving a nipple 99, that is, the nipple 99 being suitably attached to the pan 91 as clearly shown in the drawings. Additionally, the pan 91 is provided with an opening 101 for receiving a nipple 103, that is, the nipple 103 being suitably attached to the pan 93. Further, the pan 93 is provided with the opening 105 for receiving a nipple 107, that is, the nipple 107 being suitably attached to the pan 95.

Figure 15:
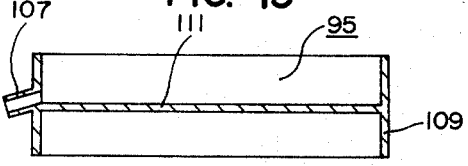
FIG. 15 is a cross sectional view of the fourth or highest elevated pan of FIG. 11.

From FIG. 15 of the drawings, it may be seen that the pan 95 is provided with suitable support structure, such as legs 109, for elevating a bottom portion 111 thereof a predetermined height above a bottom portion 113 of the pan 93. Additionally, the pan 93 includes support structure such as legs 115 for supporting the bottom portion 113 thereof a predetermined distance above a bottom portion 117 of the pan 91. Further, the pan 91 includes support structure such as legs 119 for supporting the bottom portion 117 thereof a predetermined height above a bottom portion 121 of the pan 89. Finally, the bottom portion 121 of the pan 89 includes a downwardly extending nipple or spout 123, that is, the spout 123 is suitably attached to the bottom portion 121.

The grill 55 includes a circular downwardly extending flangelike main body member 125 which restingly engages the grooves 59 of the wheels 57 whereby the grill 55 is free to be rotated about a vertical axis, as at 60. The grill 55 also includes a hub member 127, a plurality of radially arranged spokes 129, and a plurality of concentrically arranged rings 131. One of the ends of the respective spokes 129 are fixedly attached to the hub 127 as by welding or the like and the opposite ends thereof are fixedly attached to the main body member 125 as by welding or the like. The spokes 129 preferably are as wide as the main body member 125; therefore, portions thereof are cut away defining openings 133 to allow passage of flange portions 135 of the wheels 57 as the grill 55 rotates. The grill 55 also includes a plurality of uniformly spaced cog teeth 137 establishing the perimeter of the grill 55.

Figure 7:
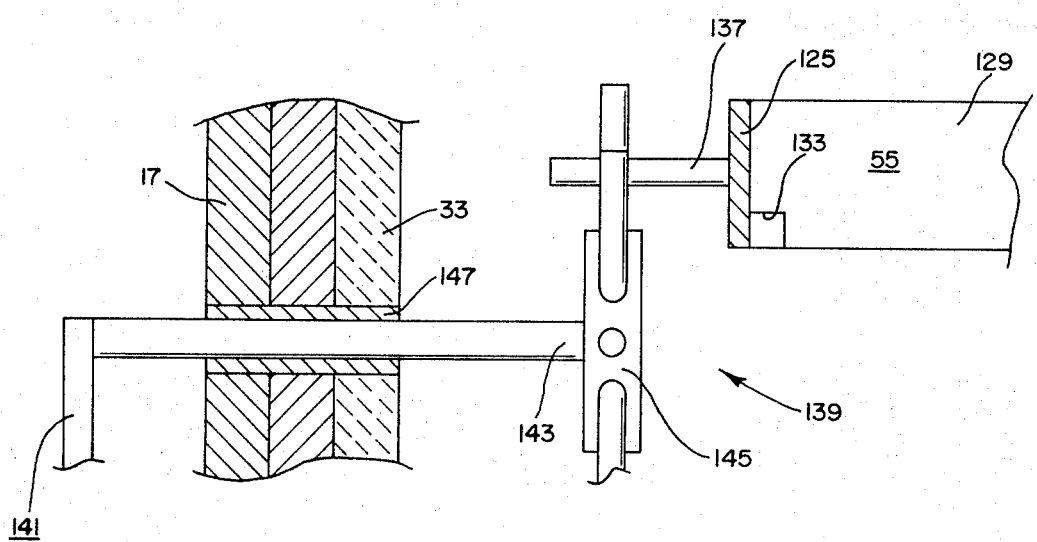
FIG. 7 is an enlarged view of a portion of FIG. 3 showing drive means for rotating the grill.

The barbecue pit 11 also includes manual drive means 139 for selectively driving the grill 55 about the vertical axis 60. The manual drive means 139 includes a crank 141 which has an inner end 143 thereof extending into the pit 29 and terminating adjacent the cog teeth 137. The drive means 139 also includes a first pinion gear 145 which is fixedly attached to the inner end 143 of the crank 141 and meshingly engages with the cog wheel or cog teeth 137 whereby turning the crank 141 is effective to rotatably drive the grill 55 about vertical axis 60. It should be understood that the crank 141 extends through the front wall 17 and the circular wall 33 and a bushing 147 is suitably provided, as clearly shown in FIG. 7 of the drawings.

The grill 55 may optionally include a removable segment or be formed from at least two sections with one of the sections being removed from the other. Therefore, from FIG. 4 of the drawings, it may be seen that a pie-shaped section 55', depicted in phantom, may be removed from the remaining portion of the grill 55.

Also included with the barbecue pit 11 is a grease receptacle 149 having an elongated funnel 151 for selectively collecting the hot grease from the spout 123. From FIG. 1 of the drawings, it may be seen that the receptacle 149 is positioned at a lower elevation than the lowermost pan 89 and adjacent the exterior of the front wall 17. From FIGS. 3 and 4 of the drawings, it may be seen that the elongated funnel 151 extends through the walls 17, 33 and includes an enlarged end 153 which is positioned subjacent the spout 123 for receiving the hot grease therefrom, that is, an opposite end 155 of the funnel 151 is positioned superjacent the receptacle 149 for discharging the hot grease therein.

The barbecue pit 11 may optionally include elevated structure 157 as depicted in FIGS. 4 – 6 of the drawings. The elevated structure 157 preferably includes two walls 159, 161 formed from fire brick and mortar or the like. Thus, a portion of the circular wall 33 and the walls 159, 161 define a chamber 163 for receiving or supporting a second bed of charcoal. The second bed of charcoal includes the charcoal pieces character referenced by the numeral 47' and a quantity of sand 49' interposed between the floor 31 and the charcoal 47'. In other words, the elevated structure 157 is positioned on the floor 31 within the pit 29 and occupies a portion of the area thereof. The area of the grill 55 exceeds the area of the elevated structure 157 or the chamber 163. Accordingly, rotating the grill 55 in a manner previously described is effective to pass substantially the entire area of the grill 55 over the second bed of charcoal 47' with one revolution thereof. Obviously, the second bed of charcoal 47' is much closer to the grill 55 than is the first bed of charcoal 47, thus the meat resting on the grill 55 may be seared more readily. In this regard, the high heat from the charcoal 47' has a tendency to cause the grease dripping from the meat to be ignited. The flames flaring up from the burning grease adversely affects the flavor of the meat. Therefore, the grill 55 may be rotated so that the meat or steak may be intermittently displaced to a remote location within the pit 29 from the second bed of charcoal 47'. It should be understood that the first bed of charcoal 47 preferably would not be ignited when using the second bed of charcoal 47' in the manner just described. More specifically, the second bed of charcoal 47' is preferably used for broiling steak, hamburgers, or the like while the first bed of charcoal 47 is used to barbecue ribs, pork roast, chicken pieces, whole turkeys, or the like.

Certain meat, such as pork ribs or the like, are rather fatty and copious amounts of hot grease emanates therefrom during the early stages of an attempt to barbecue them. Accordingly, I have found that placing the ribs in the above-described pans 89, 91, 93, 95 during the first stages of cooking or more appropriately termed the rendering process, the hot grease may be collected in the above-described receptacle 49. In this regard, a heater element 165 is included which may be temperature controlled and is beneficial for rendering the desired percentage of fat from the meat prior to cooking or prior to igniting the charcoal 47. The heater element 165 may be of the well known electric type or may be a gas-fired burner. In either event the heater 165 preferably is positioned above the grill 55 as shown in FIG. 3 of the drawings. Suitable support structure, for example, a pair of angleiron members 167, 169, extend across the pit 29 to support the heater element 165. In other words, the opposite ends of the angleiron members 167, 169 preferably are imbedded in the concrete dome-like ceiling 35. Depending upon the height of the fire brick wall 33, the members 167, 169 may optionally be imbedded in the wall 33.

The preferred procedure for using the pans 89, 91, 93, 95 and the heater element 165 is as follows: The pans 89, 91, 93, 95 are placed on the grill 55 in an arrangement substantially as depicted in FIG. 11 of the drawings. It should be understood that the pan 89 is positioned so that the spout 123 is above the enlarged portion 153 of the funnel 151 as above-described. Secondly, the meat is placed in the pans 89, 91, 93, 95 and the heater element 165 is suitably operated, that is, in a manner peculiar to the electrical or gas type desired. Thirdly, when it is determined that the desirable percentage of the fat has been rendered from the meat, the pans 89, 91, 93, 95 are removed from the pit 29 and the meat is placed on the concentric rings 131 of the grill 55. The fourth step simply involves igniting the charcoal 47 and observing the meat through the access doors 37, 39. It may be desirable that the meat be treated with various barbecue sauces immediately prior to removing it from the pit 29.

The barbecue pit 11 preferably includes a luminaire 171 which is positioned within the pit 29 for illuminating the interior thereof. Accordingly, the meat may be viewed more readily through the access doors 37, 39 during the cooking process and/or rendering process. A switch 173 preferably is positioned on the front wall 17 as shown in FIG. 1 for selectively activating the luminaire 171.

Occasionally, even though the meat may have been rendered prior to commencing the cooking process as above-described, hot grease will drip on the charcoal 47 and flames will flare up which adversely affects the flavor of the meat. In order to obviate this disadvantage I have incorporated a flame extinguisher 175 with the barbecue pit 11 as shown in FIG. 3 of the drawings. The flame extinguisher 175 includes a conduit 177 having running water therein and terminating at a strategic point within the pit 29. The protruding end of the conduit 177 is suitably fitted with a nozzle 179, that is, the nozzle 179 preferably being of the well known type which discharges a fan-shaped spray therefrom. The conduit 177 preferably is interposed with a manually operated valve 181. Opening the valve 181 causes water to emanate from the nozzle 179 and closing the valve 181 stops the flow of water through the conduit 177. It should be understood that the nozzle 179 preferably is positioned so that the water emanating therefrom does not spray upwardly toward the grill 55, that is, to avoid getting water on the meat.

The barbecue pit 11 may optinally include power-actuated drive means 183 for selectively driving the grill 55 about a vertical axis. The power-acuated drive means 183 includes a prime mover, such as an electric motor 185 or the like, having a rotatably driven output shaft 187 extending into the pit 29 with the inner end 189 thereof terminating adjacent the cog wheel or the cog teeth 137 of the grill 55. Also included is a second pinion gear 191 which is fixedly attached to the inner end 189 and meshingly engages the cog wheel or cog teeth 137 whereby operating the prime mover or motor 185 is effective to rotatably drive the grill 55 about the vertical axis in the same manner as previously described for the manual drive means 139. A single pole single throw switch 193 preferably is included for energizing and de-energizing the motor 185 in a well known manner. The switch 193 preferably is placed adjacent the switch 173 as shown in FIG. 1 of the drawings.

Figure 10:
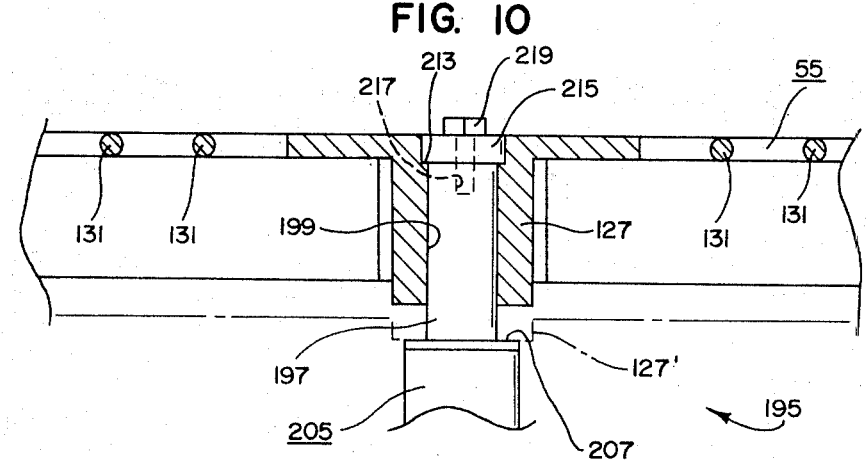
FIG. 10 is an enlarged sectional view taken as on a vertical centerline of FIG. 3 showing the hub of the grill and back up support structure thereof.

The barbecue pit 11 also includes backup support means 195 as best shown in FIG. 10 of the drawings for rotatably supporting the grill 55 in the event the flangelike main body member 125 thereof were to inadvertently become disengaged from the grooves 59 of the plurality of wheels 57.

The backup support means 195 includes a vertically disposed pintle 197 and the previously mentioned hub 127. The hub 127 is fixedly attached to the grill 55 concentrically thereof and is provided with an aperture 199 for receiving the pintle 197 whereby the grill 55 is free to rotate thereabout. The support means 195 also includes pintle support structure, as for example, angleiron members 201 fixedly attached as by welding or the like to a platelike member 203, for supporting the pintle 197 a predetermined distance above the floor 31 of the pit 29. The remote end of the angleiron members 201 are embedded in opposite portions of the wall 33 in a manner obvious to those skilled in the art. From FIGS. 3 and 10 of the drawings, it may be seen that the backup support means 195 also includes a sleeve 205 which protrudes upwardly from the platelike member 203 and is fixedly attached thereto as by welding or the like. The sleeve 205 slidably engages the pintle 197 and includes an upper shoulder portion 207 (FIG. 10) which is positioned a predetermined distance below the hub 127.

The aperture 199 preferably has an enlarged portion thereto establishing an annular shoulder 213, as shown in FIG. 10 of the drawings. A washer 215 is slidably received in the enlarged portion of the aperture 199 and a portion adjacent the outer perimeter thereof rests against the shoulder 213, thus preventing the hub 127 from becoming disengaged from the pintle 197. The pintle 197 preferably is provided with a threaded socket 217 for receiving a bolt 219, that is, the bolt 219 extending through the washer 215 as clearly shown in the drawings.

From the above disclosure, it should now be apparent that disengaging the flangelike main body member 125 of the grill 55 from the grooves 59 of the plurality of wheels 57 is effective to allow the hub 127 to slide downwardly along the pintle 197 until engaging the upper shoulder portion 207 of the sleeve 205 with the grill 55 subsequently being rotatably supported by the backup support means 195. More specifically, and still referring to FIG. 10, the hub 197 moves downwardly away from the washer 209 to a position phantomized and depicted by the numeral 127'.

Although the invention has been described and illustrated with respect to a preferred embodiment thereof, it is to be understood that it is not to be so limited since changes and modifications may be made therein which are within the full intended scope of the invention.

I claim:

1. A barbecue pit for rendering and cooking meat comprising enclosed pit means including a floor for receiving a first bed of charcoal fuel, a chimney having a lower opening thereto communicated with said pit means at a predetermined distance above said floor, damper means positioned adjacent said lower opening of said chimney and being operable between open and closed positions for selectively opening and closing said lower opening in said chimeny, a draft door positioned adjacent said floor and being operable between open and closed positions for coacting with said damper means to selectively allow various amounts of air to pass over the charcoal to support combustion thereof, at least one pan for receiving the meat during the rendering process thereof, rotatable grill means for alternately restingly supporting said pan during the rendering process and the meat during the cooking process, grill support means for rotatably supporting said grill means a predetermined distance above said floor, a spout attached to said pan for conveying hot grease outwardly therefrom which accumulates during the rendering process, a grease receptacle positioned adjacent the exterior of said pit means for collecting and storing the hot grease, an elongated funnel, said receptacle being communicated with said spout by said funnel, at least one access door opening into said pit means for passing the meat therethrough, and means for selectively driving said grill means about a vertical axis.

2. The barbecue pit of claim 1 in which is included heater element means for selectively rendering a percentage of the fat from said meat prior to cooking, said heater means being positioned above said grill means, and said meat being received by said pan whereby the hot grease may be collected therein and subsequently conveyed to said receptacle through said funnel.

3. The barbecue pit of claim 1 in which said enclosed pit includes transparent means for viewing said meat during the cooking process thereof.

4. The barbecue pit of claim 3 in which is included operable luminaire means positioned within said enclosed pit for illuminating the interior thereof whereby the meat may better be viewed through said transparent means during the cooking process thereof.

5. The barbecue pit of claim 1 in which is included elevated structure means for selectively supporting a second bed of charcoal, said elevated structure means being positioned on said floor and occupying a portion of the area thereof, the area of said grill means exceeding the area of said elevated structure means whereby rotating said grill means is effective to substantially pass the entire area thereof over the second bed of charcoal with one revolution thereof.

6. The barbecue pit of claim 1 in which said grill means includes at least two sections with one of said sections being removable from the other.

7. The barbecue pit of claim 1 in which is included built-in flame extinguisher means for selectively extinguishing flames which might flare up as a result of hot grease falling onto the burning charcoal.

8. A barbecue pit for rendering and cooking meat comprising a brick and mortar enclosure having a circular inner pit terminating upwardly thereof with a domelike ceiling and terminating downwardly thereof with a circular flat floor for receiving a first bed of charcoal fuel, a chimney having a lower opening thereto communicated with said pit at a predetermined distance below said ceiling, damper means positioned adjacent said lower opening of said chimney and being operable between open and closed positions for selectively opening and closing said lower opening in said chimney, a draft door positioned adjacent said floor and being operable between open and closed positions for coacting with said damper means to selectively allow various amounts of air to pass over the charcoal to support combustion thereof, a plurality of pans for receiving the meat during the rendering process, said pans being at different elevations and being communicated one with the other whereby hot grease which accumulates during the rendering process may gravitate from the uppermost one of said pans to the lowermost one thereof, circular grill means for alternately restingly supporting said pans during the rendering process and the meat during the cooking process, a plurality of pulley-like groove wheels respectively rotatably mounted to said enclosure for rotation about horizontal axes whereby a line passing through the respective grooves of said wheels defines a circle; said grill means including a circular downwardly extending flangelike main body member which restingly engages said grooves of said wheels whereby said grill is free to be rotated about a vertical axis, and a plurality of uniformly spaced cog teeth establishing a cog wheel defining the perimeter of said grill means; manual drive means for selectively driving said grill means about a vertical axis, said manual drive means including a crank having the inner end thereof extending into said pit and terminating adjacent said cog teeth, a first pinion gear fixedly attached to said inner end of said crank and meshingly engaging said cog wheel whereby turning said crank being effective to rotatably drive said grill means about a vertical axis, a spout attached to the lowermost one of said plurality of pans for conveying hot grease which accumulates during the cooking process outwardly therefrom, a grease receptacle, an elongated funnel for collecting the hot grease from said spout, said receptacle being positioned at a lower elevation than the lowermost one of said pans and adjacent the exterior of said enclosure, said elongated funnel extending through said enclosure and having an enlarged end thereof positioned subjacent said spout for receiving the hot grease therefrom and the opposite end of said funnel being positioned superjacent said receptacle for discharging the hot grease therein, and at least one access door opening into said pit for passing the meat therethrough.

9. The barbecue pit of claim 8 in which is included power actuated drive means for selectively driving said grill means about a vertical axis, said power actuated drive means including a prime mover having a rotatably driven output shaft extending into said pit with the inner end thereof terminating adjacent said cog wheel of said grill means, and a second pinion gear fixedly attached to said inner end of said output shaft and meshingly engaging said cog wheel whereby operating said prime mover being effective to rotatably drive said grill means about a vertical axis.

10. The barbecue pit of claim 8 in which is included backup support means for rotatably supporting said grill means in the event said flangelike main body member thereof were to inadvertently become disengaged from said grooves of said plurality of wheels, said backup support means includes vertically disposed pintle means, a hub fixedly attached to said grill means concentrically thereof and having an aperture for receiving said pintle means whereby said grill means is free to rotate thereabout, pintle support means for supporting said pintle means a predetermined distance above said floor of said pit, and sleeve means circumferentially engaging said pintle means and having an upper shoulder portion thereto positioned a predetermined distance below said hub whereby disengaging said flangelike main body member of said grill means from said grooves of said plurality of wheels being effective to allow said hub to slide downwardly along said pintle means until engaging said upper shoulder portion of said sleeve with said grill means subsequently being rotatably supported by said backup support means.

* * * * *